June 9, 1959  F. R. McFARLAND ET AL  2,889,844
GOVERNOR CONTROL VALVE
Filed March 31, 1955
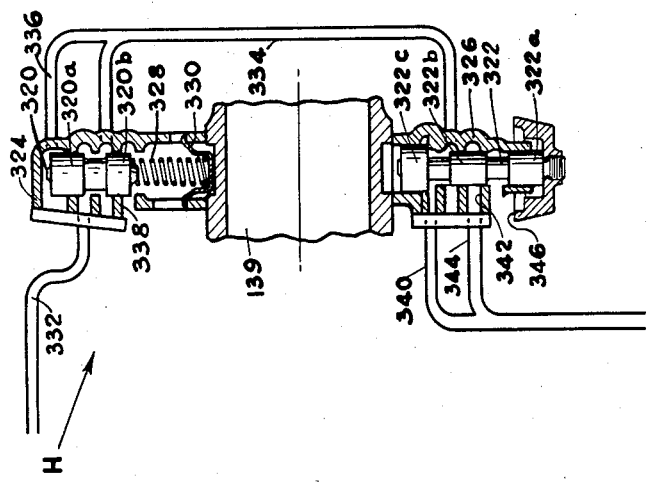
Inventor
FOREST R. MC FARLAND
CARROLL J. LUCIA
By
Wilson, Redraw and Sadler
Attorney United States Patent Office 2,889,844
Patented June 9, 1959

2,889,844

GOVERNOR CONTROL VALVE

Forest R. McFarland, Huntington Woods, and Carroll J. Lucia, Birmingham, Mich., assignors to Studebaker-Packard Corporation, Detroit, Mich., a corporation of Michigan Application March 31, 1955, Serial No. 498,408

3 Claims. (Cl. 137—54)

This invention relates to a control valve used in conjunction with a hydraulic control system for a vehicle transmission. More particularly, it relates to a hydraulic control valve which in response to variations in the centrifugal forces developed by the rotation of the transmission output shaft, delivers fluid pressure substantially proportional to the vehicle driving speed to the transmission control system for the various transmission clutches.

In a conventional type control system for a vehicle transmission having low and high driving ranges engageable by hydraulically operated brakes and clutches, the automatic selection of the desired driving range is in part made dependent upon the driving speed of the vehicle, in order to operate the vehicle efficiently. To this end, various types of governor control valves have been developed for the purpose of delivering governor fluid pressure to the transmission control system which is proportional to the speed of the vehicle. As a general rule, however, these governor control devices are not accurate throughout the full range of possible driving speeds and frequently the governor pressure output at either relatively high or low driving speeds is not of sufficient value to effectively operate the control system.

In this connection, it will be appreciated that in most control systems of this general type, the pressure reservoir is supplied with fluid under pressure by the pump driven by the output shaft of the transmission. When a conventional type governor control valve is utilized in conjunction therewith, it is necessary for the pump to deliver a relatively high fluid pressure at low driving speeds in order that the governor output pressure is of a sufficient value to operate the control system effectively at low speeds. As a result, it will be apparent that when the output shaft is rotated at a relatively high speed the fluid pressure delivered to the reservoir has too high a value, and frequently much of the proportional pressure regulation of the governor is lost.

It is therefore an object of this invention to provide a governor control device for a hydraulic transmission control system which not only delivers a governor pressure substantially proportional to the speed of the vehicle through a wide range of driving speeds, but in addition, provides a proportional output pressure which is sufficiently high at both low and high driving speeds to effectively operate the control system.

The application has devised a simplified, inexpensively manufactured governor valve for the above purpose which is described in conjunction with a transmission and control system similar to that disclosed in the McFarland, Lucia and DeLorean patent application No. 498,404 filed March 31, 1955.

For a further understanding of the invention, reference may be had to the accompanying figure, which is a view in section of a governor regulator valve.

It is to be understood that the invention is not limited in its application to the details of construction and arrangement of parts illustrated in the accompanying figure, since the invention is capable of other embodiments and of being practiced or carried out in various ways. Further, it is to be understood that the terminology employed herein is for the purpose of description and not of limitation.

With specific reference to the figure it will be seen that the governor valve H includes a lightweight high speed valve 320 and a heavier weighted low speed valve 322 which are reciprocably mounted in valve chambers 324 and 326, respectively. The valve chambers 324 and 326 are fixedly mounted on output shaft 139, and the centrifugal force generated by their rotation tends to move the valve 320 and 322 away from and at right angles to the axis of the shaft. The centrifugal force acting upon the high speed valve 320 is supplemented by a spring 328 retained within the housing 324 between the under side of the valve and a spring stop member 330 which bears against the output shaft.

Fluid pressure from a transmission rear pump (not shown) is delivered to the high speed valve chamber 324 through conduit 332. The spring 328 normally positions the valve 320 so that land 320a uncovers conduit 332, and thus the rear pump pressure is permitted to flow out of the valve chamber through conduit 334 to the low speed governor valve chamber 326. Pressure from conduit 334 is also delivered to the upper end of the high speed valve chamber 324 through connecting conduit 336, and tends to move valve 320 inwardly against the action of the spring 328 and the centrifugal force, if any. As a result, the flow of fluid pressure from conduit 332 is metered by the relative movement of valve land 320a in respect thereto. If the pressure in conduit 334 exceeds a predetermined maximum limit for any driving speed, valve 320 is moved inwardly a sufficient distance by the fluid pressure at its outer end so that land 320a covers conduit 332 and land 320b uncovers vent port 338, whereupon, fluid pressure from line 334 flows through vent port 338 communicating with the sump.

It will be appreciated that the fluid pressure in conduit 334 at least must be equal to the force exerted by spring 328 before the high speed valve 320 commences to regulate the governor output pressure. It will also be appreciated that the relatively light weight high speed governor valve is adapted to provide a more sensitive pressure regulation at higher vehicle speeds than would be possible using only a heavier weighted low speed valve, next to be described.

The low speed valve 322 has three lands; lands 322a and 322b which are disposed near its outer end and center portion, respectively, being of equal but smaller diameter than land 322c disposed adjacent the output shaft 139. When the output shaft 139 is rotated, valve 322 is moved outwardly by centrifugal force and land 322b uncovers conduit 334 whereupon fluid pressure is permitted to flow between lands 322b and 322c to the governor outlet conduit 340. At the same time, the fluid pressure in chamber 326 tends to move valve 322 inwardly, due to the larger diameter of land 322c, and as a result, land 322b meters the pressure flow from conduit 334. It will be appreciated that the low speed valve 322 is adapted to provide a relatively steep increase in governor output pressure, due to its heavier weight and the differential area of lands 322b and 322c.

If the pressure in conduit 340 exceeds a predetermined limit, valve 322 is moved inwardly a sufficient distance so that land 322b covers conduit 334. Land 322b also uncovers a port 342 communicating with the outlet conduit 340 through connecting conduit 344. Thus, fluid pressure is permitted to flow through port 342 to a vent port 346 until the pressure in conduit 340 is sufficiently reduced and valve 322 is returned to its normal metering position.

It will be apparent that other forms of the invention may be employed without departing from the spirit of the invention, and it is to be understood that the following claims are not to be considered as limited solely to the details of construction and arrangement of parts illustrated and described in the specification.

What is claimed is:

1. In a transmission control system for a vehicle transmission with an output shaft and a fluid pressure reservoir, a governor device comprising, a high speed valve connecting with the output shaft and having an inlet port, means connecting the inlet port with the reservoir, an outlet port and a return port, means connecting the return port with the outlet port, means connecting the inlet port with the outlet port, said high speed valve being responsive to centrifugal force developed by the rotation of the output shaft to increase the fluid pressure flow between the inlet and outlet ports, said high speed valve also being responsive to the outlet port pressure admitted through said return port to decrease the fluid pressure flow between the inlet and outlet ports, resilient means to condition said high speed valve to admit a relatively high fluid pressure through the outlet port when the output shaft is rotated at a relatively low speed, a low speed valve connecting with the output shaft having an outlet port, and an inlet port connecting with the high speed valve outlet port, said low speed valve being responsive to centrifugal force developed by the rotation of the output shaft to increase the fluid pressure flow between its inlet and outlet ports, and said low speed valve being responsive to its inlet port pressure to decrease the fluid pressure flow between its inlet and outlet ports.

2. In a transmission control system for a vehicle transmission with an output shaft, a governor valve means operatively responsive to the centrifugal force developed by the rotation of the output shaft, fluid pressure producing means communicating with said governor valve means comprising, a housing means with its longitudinal axis mounted substantially at right angles to the longitudinal axis of the output shaft, a primary inlet port communicating with the interior of said housing, a primary outlet port communicating with the interior of the housing, a pair of longitudinally movable valve members in said housing, one of said valves communicating with said primary inlet port and the other of said valves communicating with the primary outlet port, said one valve having a secondary outlet port communicating therewith, and a pressure return port situated in the housing over the outermost end of said one valve, fluid conveying means connecting the secondary output port and pressure return port, said one valve member being mounted for reciprocable movement within the housing so that the centrifugal force developed by the rotation of the output shaft tends to move the valve member away therefrom to open said primary inlet port whereby said one valve member tends to permit said fluid pressure to remain unthrottled between the primary inlet and secondary outlet ports when moved away from the output shaft, and to decrease the fluid pressure flow between the primary inlet and secondary outlet ports when it is moved toward the output shaft, resilient means to move the one valve member away from the output shaft thereby tending to minimize throttling of fluid pressure flow through the outlet port when the output shaft is rotating at relatively slow speeds, and the secondary outlet port pressure admitted over the valve through the return port tending to move the valve member toward said output shaft in opposition to the resilient means and the centrifugal force to throttle the fluid pressure flow through the outlet port, said other valve being movably mounted in the housing means with its longitudinal axis mounted substantially at right angles to the longitudinal axis of the output shaft, a pressure return port communicating with the outer end of said other valve, fluid conveying means connecting the primary outlet and said last mentioned return port, a secondary inlet port communicating with said other valve, fluid conveying means communicating between said secondary outlet port of said one valve and said secondary inlet of said other valve, said other valve member being responsive to centrifugal force developed by the rotation of the output shaft to unthrottle the fluid pressure flow between the secondary inlet and primary outlet port, and said other valve also being responsive to the primary outlet port pressure to tend to throttle the fluid pressure flow between said secondary inlet port and the primary outlet port.

3. In a transmission control system for a vehicle transmission with a rotating output shaft and a source of fluid pressure supply, a governor device comprising a high speed valve responsive to the r.p.m. of the output shaft, said valve having an inlet port, means connecting said inlet port with said source of fluid pressure, an outlet port leading from said high speed valve, and means for producing fluid pressure on one end of said high speed valve equal to that prevailing at said outlet port, said high speed valve effecting an increase in the pressure of fluid flowing through the valve in proportion to the r.p.m. of said output shaft and the fluid pressure at the outlet port tending to throttle the flow of pressure fluid between said inlet and outlet ports, resilient means coacting with the high speed valve in opposition to said throttling action produced by the outlet pressure, a low speed valve responsive to the r.p.m. of the output shaft, said low speed valve having an inlet and outlet port, means connecting said low speed valve inlet port with the outlet port of said high speed valve, said low speed valve being responsive to the r.p.m. of the output shaft and being operative to throttle the fluid flow between its inlet and outlet, said low speed valve being constructed and arranged such that said throttled low speed valve pressure tends to counteract the response of said valve to the r.p.m. of said output shaft, and means to effect venting of pressure fluid from said output through said low speed valve when the pressure becomes too high therein, said high speed and low speed valves being operative serially to control the flow of pressure fluid through said control system whereby said low speed valve is initially active to control the pressure at the output port thereof during relatively low r.p.m. of said output shaft and said high speed valve becomes effective at relatively high r.p.m. of said output shaft to normally take over and control the pressure at the output port of said low pressure valve.

References Cited in the file of this patent

UNITED STATES PATENTS 2,711,749    Hettinger    June 28, 1955